April 22, 1930.  O. T. ISAACSON  1,755,650
CONNECTING ROD
Filed Feb. 15, 1928  2 Sheets-Sheet 1
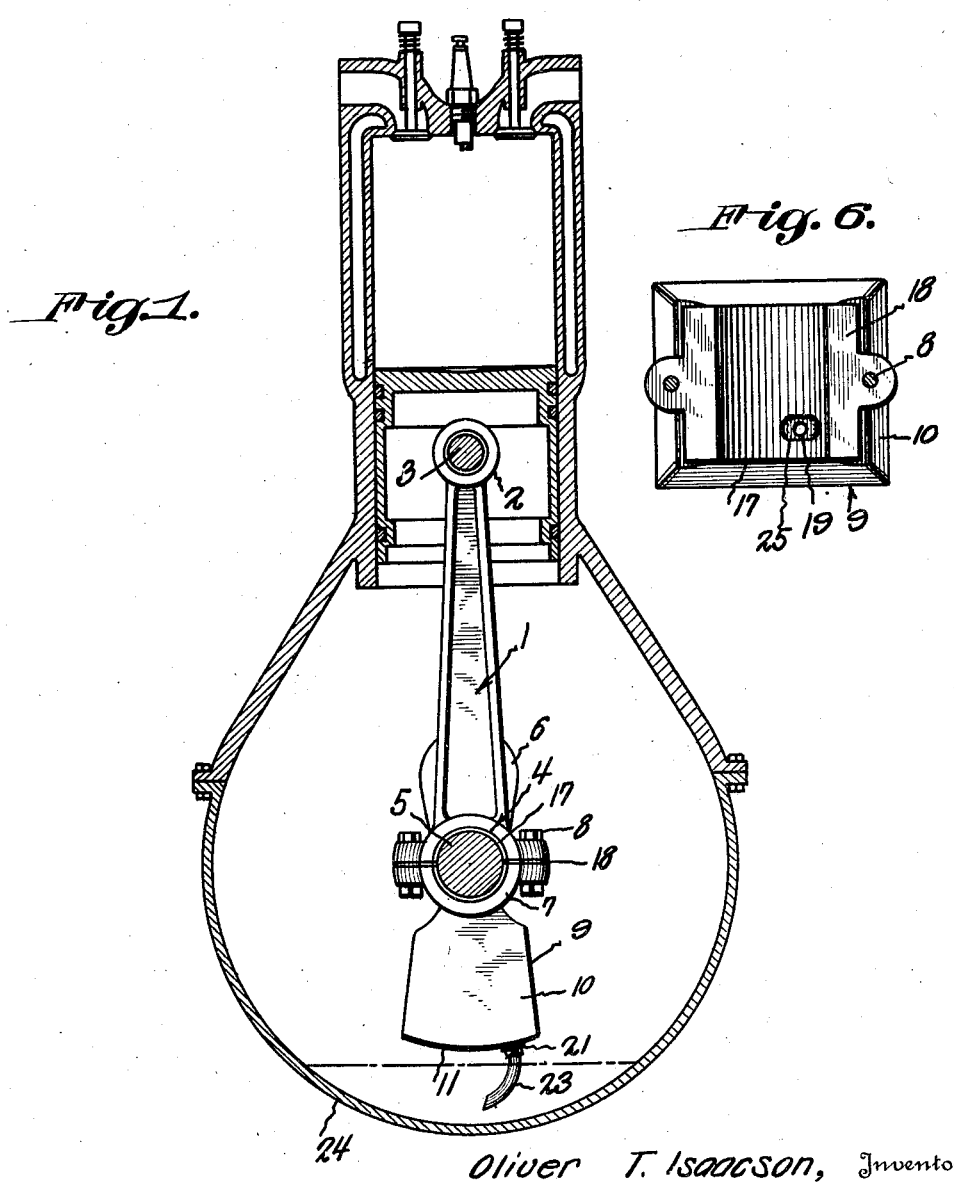
Oliver T. Isaacson, Inventor April 22, 1930.  O. T. ISAACSON  1,755,650
CONNECTING ROD
Filed Feb. 15, 1928  2 Sheets-Sheet 2
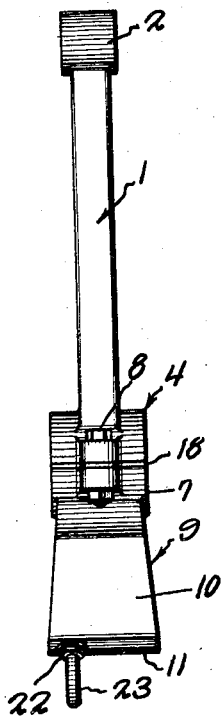
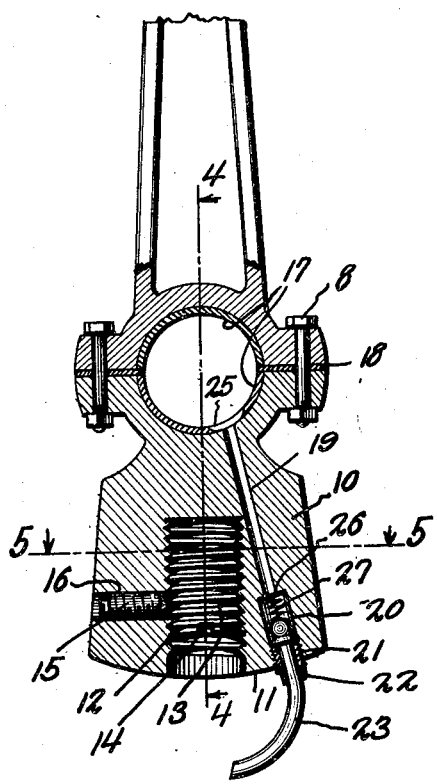
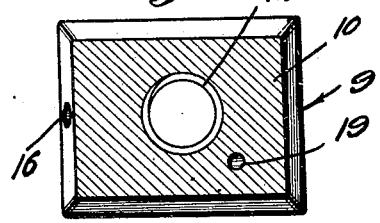
Oliver T. Isaacson, Inventor Patented Apr. 22, 1930

1,755,650

UNITED STATES PATENT OFFICE

OLIVER T. ISAACSON, OF ST. CLOUD, MINNESOTA

CONNECTING ROD

Application filed February 15, 1928. Serial No. 254,503.

This invention relates to improvements in connecting rods and has as its general object to provide a connecting rod which will greatly enhance the efficiency of the engine or other mechanism of which it constitutes a part.

In connecting rods as ordinarily constructed, and where such rods are employed, for example, in internal combustion engines or steam engines, the power transmitted to the rod from the piston with which it is connected is in the nature of a rectilinear force which is imposed upon or transmitted to the crank to which the rod is connected, and this force is expended substantially at the moment the crank to which the rod is connected, reaches the end of its throw, so that, when the crank and connecting rod are in this position, there is a tendency toward cessation of movement of the parts. This is also true of connecting rods where they are employed in machinery for imparting power to moving parts, from a crank shaft. Therefore the present invention has as one of its objects to provide a connecting rod embodying a counterweight which will act to give impetus to the rod, near the end of its stroke, thus providing means for translating or converting the rectilinear force into a curvilinear force and thus carrying the crank connected end of the connecting rod past dead center, and therefore the invention contemplates the provision of a connecting rod which will effect a more uniform and steady application of power to the parts to be moved thus materially increasing the efficiency of the mechanism of which the connecting rod constitutes a part.

Another object of the invention is to provide means for accomplishing the results above outlined and which means may be embodied in a connecting rod adapted for connection with a crank or with an eccentric, the means employed being equally effective in converting the rectilinear force, imposed upon the rod, into a curvilinear force, for the purposes stated.

Another object of the invention is to provide, in connection with a connecting rod embodying the means referred to above, novel means whereby lubricant may be supplied to that end of the connecting rod which is connected with the crank or other eccentric part to which or from which power is to be transmitted through the medium of said rod.

While the accompanying drawings and the description which is to follow, constitute a disclosure of the preferred embodiment of the invention, it will be understood that various changes may be made within the scope of what is claimed.

In the accompanying drawings:

Figure 1 is a view in elevation of a connecting rod, embodying the invention, installed in an internal combustion engine;

Figure 2 is a side elevation of the connecting rod;

Figure 3 is a detail view partly in vertical section and partly in elevation illustrating the lower end of the rod or in other words that end which is to be connected with the crank or other eccentric part from which or to which power is to be transmitted;

Figure 4 is a vertical transverse sectional view taken substantially on the line 4—4 of Figure 3 looking in the direction indicated by the arrows;

Figure 5 is a horizontal sectional view taken substantially on the line 5—5 of Figure 3 looking in the direction indicated by the arrows;

Figure 6 is a top plan view of the lower section of the connecting rod.

Figure 1 of the drawings illustrates the connecting rod, embodying the invention, installed in an internal combustion engine, but it will be evident from the description which is to follow, that the connecting rod may be employed in other relations and in other mechanisms without in any way departing from the spirit of the invention. The connecting rod embodies a section 1 provided at one end with the usual bearing collar 2 for connection with a part such for example as the wrist pin 3 of an engine piston, as shown in Figure 1 of the drawings, the rod being provided at its opposite end with one-half of a bearing 4 which is to fit an eccentrically movable part, such for example as the crank 5 of a crank shaft 6, as shown in the said Figure 1, the cap or other section of the bearing 4, being indicated by the numeral 7, and the two sections being secured together, in the usual manner, by the bolts 8. At this point it may be stated that Figure 1 is only representative of one use of the connecting rod embodying the invention and that the part 3 may either constitute a power delivering part as in the said Figure 1, or a part to be driven, and, on the other hand, the part 5, which is eccentrically movable, may constitute a driven part as in the said figure, or a power delivering part.

The cap 7 of the bearing 4 constitutes a preferably integral part of the other section of the connecting rod embodying the invention, which section is indicated by the numeral 9, and this section comprises a body 10 which is of metal and which possesses sufficient mass to adapt it to constitute, in effect, a counterweight for the purpose of converting the rectilinear force imposed upon the connecting rod, into a curvilinear force in attaining the objects of the present invention. The body 10 may be of any desired contour as for example the frusto-pyramidal form shown in the drawings and preferably having a transversely convex under side indicated by the numeral 11, for a purpose to be presently explained.

At this point it will be observed that the counterweight 10 is located at that side of the eccentric part 5, opposite the side at which the section 1 of the connecting rod is located, and, in practice, this body 10 will possess such weight or mass that the center of gravity of the connecting rod, as a whole, will be much nearer the axis of the crank or other part 5 than to the wrist-pin or other part 3, the mass of the body 10 being further proportioned in consonance with the length of stroke and weight of the connecting rod, the bearing 2, and the piston head or other moving parts, as the case may be. It will likewise be understood at this point that, in the operation of the mechanism in connection with which the connecting rod is employed, the line of force transmitted to the part 5 or from this part, will be at all times tangential to the circle described by the axis of the part 5, in the movement of said part, and it is for this reason that the force transmitted, by the connecting rod, to the part 5, in the illustrated embodiment of the invention, will be converted into a curvilinear force, with the result that more power will be transmitted to the crank shaft, where the connecting rod is employed in connection with an internal combustion or other type of engine, and, where the connecting rod is employed in a mechanism in which the part 5 constitutes the power delivering part and the part 3 the driven part, greater power will be delivered to the said part 3 in the rotation or travel of the part 5.

In order that the effective mass or weight of the section 9 of the connecting rod may be accurately varied, the body 10 is formed with a cylindrical bore 12 opening through its lower end 11, and a comparatively large and heavy threaded plug 13 is adjustably fitted into the said bore, the bore being threaded to adjustably accommodate the said plug. The plug may be provided in its lower end with a rectangular socket 14 for the engagement therein of a suitable tool for effecting rotative adjustment of the plug, and it will be evident that its effectiveness may be varied by adjusting the plug toward and away from the axis of the bearing comprising the parts 4 and 7. In order that the plug may be held in various positions of adjustment, a set screw 15 is adjustably threaded in a bore 16 formed in the body 10 counter to the bore 12, and this set screw is adjustable to bind at its inner end against the plug 13, for the purpose stated. At this point it will be evident that adjustment of the plug 13 will serve to vary the effective mass of the member 9, as a whole, the inertia of the member 9 being greater when the plug is adjusted to a position more remote from the axis of the part 5, than when adjusted to a position nearer said axis.

Where the connecting rod, embodying the invention, is employed in an internal combustion engine, the bearing members 4 and 7 are preferably provided with linings 17, and shims 18 are arranged between these members, and, as previously stated, the invention contemplates the provision of novel means whereby lubricant may be supplied to this bearing, and this means will now be described.

As illustrated in Figures 3 and 5 of the drawings, the body 10 of the section 9 of the connecting rod is formed with a bore 19, and this bore is enlarged at its lower end as at 20 and the lower end of the enlargement is threaded as at 21 to accommodate a bushing 22 which retains one end of a dipping or take-up spout 23. It will be observed by reference to Figures 1 and 3 of the drawings that the spout 23 is curved downwardly and laterally inwardly toward the longitudinal center of the connecting rod as a whole, the lower end of the bore 19 terminating at one side of this center line, so that, in the operation of the connecting rod, and as the crank 5 passes through the latter half of its down stroke and first half of its up stroke, the intake end of the spout 23 will be caused to pass through lubricating oil contained within the sump 24 of the crank case of the engine, and in this manner the lubricating oil will be taken up by the spout and delivered upwardly through the bore 19. The upper end of the bore 19 communicates with an opening 25 which is formed in the lining 17 which is arranged within the section 7 of the bearing 4, and therefore the lubricating oil taken up by the spout 23 and delivered through the bore 19, may reach the surface of the crank 5 and the inner surfaces of the linings 17 for the bearings. In order that oil taken up by the spout 23 and delivered into the bore 19 may be prevented from flowing back into the crank case, by way of the spout, a small check valve 26 is arranged within the enlargement 20 of the bore 19 in position to rest upon the upper or inner end of the said spout 23, a compression spring 27 being likewise arranged within the said enlargement of the bore and bearing against the valve to yieldingly hold the same in position closing the upper end of the said spout. It will be understood of course that the check valve may be dispensed with if desired as, in most instances, sufficient oil will be taken up by the spout 23 and with sufficient force of flow through the spout to effect thorough lubrication of the bearing.

It will be evident from the foregoing description of the invention that the weight body 10 of the section 9 may be formed separate from the bearing member 7 and secured thereto, or formed integral therewith as shown in the drawings, and it will likewise be understood that this body 10 may be of some form other than that illustrated in the drawings, so long as a counterweight is provided at this end of the connecting rod.

As previously stated, the under side of the body 10 is transversely curved and it will be evident that due to this curvature, the lubricating oil in the sump 34 will not be directed away from the intake end of the spout 23 in the operation of the connecting rod.

While the auxiliary weight 13 presents the advantages ascribed to it above, it will be understood of course that if the counterweight 10 is properly proportioned, as regards its mass, with respect to the connecting rod proper, the piston head, the connecting rod bearings, and other parts, this weight may be dispensed with. It will also be understood that where the weight is employed, it need not be threaded adjustably into the bore in the weight 10, but may be slidably fitted in said bore and secured in positions of adjustment by any suitable means.

Having thus described the invention, what I claim is:

1. A connecting rod comprising a substantially straight connecting rod proper having at one end a bearing section, a second section connected with and together with the first mentioned section forming a complete bearing, a counterweight carried by the second mentioned section and extending in alinement with the rod proper and spaced therefrom by the bearing, said counterweight having a threaded socket in alinement with the rod proper, a threaded weight movable in said socket toward and away from the bearing, and a screw engaging the side of the threaded weight and adapted to lock the weight at an adjusted position.

2. A connecting rod comprising a substantially straight connecting rod proper having at one end a bearing section, a second section connected with and together with the first mentioned section forming a complete bearing, a counterweight carried by the second mentioned section and extending in alinement with the rod proper and spaced therefrom by the bearing, said counterweight having a socket in alinement with the rod proper, a weight movable in said socket toward and away from the bearing, and means engaging in the side of the weight and adapted to lock said weight in adjusted position.

3. A connecting rod comprising a substantially straight connecting rod proper having at one end a bearing section, a second section connected with and together with the first mentioned section forming a complete bearing, a counterweight carried by the second mentioned section and extending in alinement with the rod proper and spaced therefrom by the bearing, said counterweight having a threaded socket in alinement with the rod proper, a threaded weight movable in said socket toward and away from said bearing, and means engaging the thread of said threaded weight and adapted to lock the weight in adjusted position.

In testimony whereof I affix my signature.

OLIVER T. ISAACSON.